United States Patent [19]

Endoh et al.

[11] Patent Number: 6,054,177
[45] Date of Patent: Apr. 25, 2000

[54] MOLDING MATERIAL AND PROCESS FOR THE PRODUCTION THEREOF

[75] Inventors: Yoshihiro Endoh; Yoshio Iizuka, both of Shizuoka, Japan

[73] Assignee: Toho Rayon Co., Ltd., Japan

[21] Appl. No.: 08/952,750

[22] PCT Filed: May 28, 1996

[86] PCT No.: PCT/JP96/01433

§ 371 Date: Nov. 13, 1997

§ 102(e) Date: Nov. 13, 1997

[87] PCT Pub. No.: WO96/38280

PCT Pub. Date: Dec. 5, 1996

[30] Foreign Application Priority Data

May 29, 1995 [JP] Japan ................................. 7-153992

[51] Int. Cl.[7] .............................. B05D 1/36; B05D 1/06; B05D 3/02; B32B 31/00

[52] U.S. Cl. .......................... 427/203; 427/195; 427/482; 427/385.5; 427/389.8; 427/407.3; 427/434.6; 427/421; 156/166; 156/180

[58] Field of Search ..................... 427/195, 203, 427/482, 385.5, 389.7, 389.8, 407.2, 407.3, 434.6, 434.7, 421, 422; 428/378, 372, 396; 118/DIG. 19; 156/166, 180, 242

[56] References Cited

U.S. PATENT DOCUMENTS

| | | | |
|---|---|---|---|
| 3,862,287 | 1/1975 | Davis | 264/131 |
| 4,614,678 | 9/1986 | Ganga | 428/74 |
| 5,026,410 | 6/1991 | Pollet et al. | 65/3.43 |

FOREIGN PATENT DOCUMENTS

| | | |
|---|---|---|
| 0 338 115 | 7/1988 | European Pat. Off. . |
| 338115 | 10/1989 | European Pat. Off. . |
| 2548084 | 6/1983 | France . |
| 1-501233 | 4/1989 | Japan . |
| 1-228806 | 9/1989 | Japan . |
| 88/03468 | 5/1988 | WIPO . |

OTHER PUBLICATIONS

Journal of Thermoplastic Composite Materials, vol. 3, Oct. 1990 pp. 325–354.

38th International SAMPE Symp., Holty et al, Variables Affecting the Physical Properties of Consolidated Flexible Powder–Coated Towpregs, May 10–13, 1993.

*Primary Examiner*—Shrive Beck
*Assistant Examiner*—Michael Barr
*Attorney, Agent, or Firm*—Lorusso & Loud

[57] ABSTRACT

By depositing a thermoplastic resin powder inbetween the individual fibers of a reinforcing continuous fiber bundle and subsequently applying a solution of a binder resin dissolved in a solvent to the resulting reinforcing continuous fiber bundle, the thermoplastic resin powder is fixed inbetween the individual fibers via the binder resin which concurrently works to bind the individual fibers together. Then, the solvent of the binder resin is substantially removed from the resulting reinforcing continuous fiber bundle within a temperature zone not above the melting point or flow point of the thermoplastic resin powder. In the molding material produced by the method, the individual fibers of the reinforcing continuous fiber bundle, the individual fibers and the thermoplastic resin powder, and the individual thermoplastic resin powders are independently fixed together, all in a pin-point fashion via the binder resin, so the molding material contains substantially no solvent of the binder resin. The molding material of the present invention is non-adhesive and drapable, has good handleability, exhibits excellent lay-up workability and outstanding moldability, and dissociation of the thermoplastic resin powder is prevented. Articles molded from the molding material of the present invention have great composite properties and excellent appearance.

9 Claims, 2 Drawing Sheets

MOLDING MATERIAL AND PROCESS FOR THE PRODUCTION THEREOF

TECHNICAL FIELD OF THE INVENTION

The present invention relates to a non-adhesive and drapable molding material, which is produced by depositing a thermoplastic resin powder on a reinforcing continuous fiber bundle and applying a resin different from the thermoplastic resin powder as a binder resin, whereby the dissociation of the thermoplastic resin powder from the reinforcing continuous fiber bundle is prevented; and to a method for producing the molding material.

Since the molding material comprising a continuous fiber-reinforced thermoplastic resin in accordance with the present invention has the properties described above, the molding material exhibits good lay-up workability and moldability; and the resulting molded articles have excellent mechanical performance for use in wider fields such as general industries and aerospace fields.

BACKGROUND ART

When molding materials comprising continuous fiber-reinforced thermoplastic resins are classified on the basis of the impregnation state of the resins, the materials are broadly grouped as follows: molding materials in sheet forms, namely molding materials of so-called completely impregnated type, wherein the resins are once melted and completely impregnated in between the reinforcing continuous fibers; and molding materials wherein the resins are present in their non-melted state, namely molding materials of non-melted type.

Although the former molding materials of completely impregnated type are not drapable because the resins therein form a matrix layer, the latter molding materials of non-melted type are drapable because the non-melted resins are present between the reinforcing continuous fibers.

In the molding materials of the completely impregnated type, the resins are preliminarily impregnated completely in between the reinforcing continuous fibers. Therefore, no need exists to re-impregnate the resins in a molding process. Thus, such molding materials can produce molded articles in a relatively short period by selecting and effecting an appropriate heating process and an appropriate molding pressure during molding. Hence, the materials have outstandingly good high-speed moldability and are a convenient material form for high productivity. For the production of a molded article of a complex shape such molding materials of the completely impregnated type may be used; however, the molded materials cause difficulty in lay-up due to not being drapable. Therefore, a molded article is then likely to be limited to a relatively simple shape.

In contrast, the latter molding materials of the non-melted type are provided with drape properties so as to overcome such a problem. The latter molding materials are broadly divided into molding materials produced by forming a thermoplastic resin into a fiber and then mixing the fiber with a reinforcing continuous fiber (molding materials by so-called fiber method) and molding materials produced by pulverizing a thermoplastic resin and then depositing the resulting pulverized resin onto a reinforcing continuous fiber (molding materials by so-called powder method).

The molding materials produced by the fiber method include hybrid yarn (produced by twisting a reinforcing continuous fiber and a resin fiber together), commingled yarn (comprising a reinforcing continuous fiber and a resin fiber, which are preliminarily mixed together at a monofilament level), and co-woven (woven fabric using hybrid yarn and commingled yarn). By the fiber method, resins which can not be formed into fiber cannot be used as matrix resins, and therefore, the resin types to be used by the method are limited to some extent.

The molding materials produced by the powder method are advantageous in that almost all resins can be pulverized finely so a wide variety of resins may be selected. The powder method for producing molding materials includes a method comprising passing a reinforcing continuous fiber through a fluid bed of a thermoplastic resin powder, a method comprising depositing a thermoplastic resin powder onto a reinforcing fiber in an electrostatic manner, and a method comprising passing a reinforcing continuous fiber through a bath suspending a thermoplastic resin powder. The molding materials produced by these methods are drapable, but because the thermoplastic resin powder is only physically interposed in between the reinforcing continuous fibers in the materials, the thermoplastic resin powder is readily dissociated from the reinforcing continuous fiber by an external force. Additionally, the reinforcing continuous fiber is also readily split by an external force. Thus, the molding materials are problematic in terms of handleability.

To overcome these problems, the following processes described in the items (1) to (4) are already known.

(1) A process of coating the surface of a thermoplastic resin powder-deposited reinforcing continuous fiber bundle in a tube shape with a melted resin, comprising continuously passing the bundle through the melted resin by means of a crosshead extruder (see Specification of France Patent Application No. 2548084 (A1)).

(2) A process of heating a thermoplastic resin powder-deposited reinforcing fiber bundle (fiber bundle) to semi-melt the resin to deposit the resin onto the reinforcing fiber (see J. Thermoplastic Composite Materials, Vol. 3, October 1990, pp. 325–354, "Manufacture of Powder-Impregnated Thermoplastic Composites").

(3) A process of winding a thermoplastic resin fiber over a reinforcing fiber bundle deposited with a thermoplastic resin powder ("VARIABLES AFFECTING THE PHYSICAL PROPERTIES OF CONSOLIDATED FLEXIBLE POWDER-COATED TOWPREGS," D. W. Holty et al., submitted for publication at the 38th International SAMPE Symposium: May 10–13, 1993).

(4) A process of dispersing a thermoplastic resin powder into an aqueous medium containing, dissolved therein a water-soluble polymeric binder, and impregnating a reinforcing fiber bundle with the resulting viscosity-increased dispersion/solution to prepare a molding material containing the aqueous medium in the amount of 10 to 70% by weight (Japanese Patent Marking No. Hei 1-501233 (1989) and Japanese Patent Laid-open No. Hei 1-228806 (1989)).

The techniques for providing drape, described as (1) to (4) above, have the following drawbacks. More specifically, the method in the item (1) is disadvantageous in that the resin is at such a higher level in the resulting molding material that it is difficult to elevate the fiber content therein and additionally in that a resin-enriched layer is formed in between the reinforcing continuous fibers adjacent to each other after molding, so that portions with no presence of fiber therein are formed in part. The cross-section of the molding material is of an elliptical shape, so the material is so bulky that molds for molding such a material are designed with much difficulty, which limits the molding method.

According to the method in the item (2), the thermoplastic resin powder is simply semi-melted and deposited on the reinforcing fiber bundle. Therefore, the dissociation of the thermoplastic resin powder by an external force cannot be completely protected against because the thermoplastic resin powder does not constrain the reinforcing fiber bundle. Additionally, the reinforcing fiber bundle is readily split by an external force, sometimes causing problems in the handleability of the molding material. Since the molding material is so bulky as described in (1), furthermore, similar problems occur.

According to the method (3), the reinforcing fiber bundle is fastened tight via the fiber of the thermoplastic resin. Therefore, the method (3) can overcome the splitting problem of the resulting molding material better than the method (2), but the production process then gets more complex. By the method (3), furthermore, the dissociation of the thermoplastic resin powder deposited onto the reinforcing fiber bundle cannot be protected against satisfactorily. Since the molding material is so bulky as described in connection with (1), additionally, similar problems occur.

Because the molding material produced by the method (4) contains an aqueous medium at a concentration as high as 10 to 70% by weight, a process of evaporating the aqueous medium is essential to molding the material. Therefore, the method is problematic in that the molding process is complex and in that adverse effects on the molded articles, such as the occurrence of voids, can hardly be avoided due to a high content of the evaporating components.

So as to avoid these problems caused by the higher concentration of the aqueous medium in the molding material produced by the method (4), the molding material is dried to evaporate the aqueous medium to below 10% by weight. But such a method is also disadvantageous in that the drape deteriorates or is eliminated in the resulting material. The deterioration of the drape through the evaporation of the aqueous medium is presumed to be due to a mechanism in production of the molding material by the method (4), by which the reinforcing fiber bundle and the thermoplastic resin powder are impregnated with the aqueous solution of the water-soluble polymeric binder of a high viscosity and the water-soluble polymeric binder works to more rigidly bind the reinforcing fiber bundle and the thermoplastic resin powder together, upon evaporation of the aqueous medium.

Because the method (4) applies a highly viscous dispersion solution of 50,000 cps to 3,000,000 cps, comprising a water-soluble polymeric binder, an aqueous medium and a thermoplastic resin powder to a reinforcing fiber bundle, the method has a drawback in that uniform dispersion of the thermoplastic resin powder is difficult.

According to the method (4), it is recommended to add a surfactant for the purpose of uniformly dispersing the thermoplastic resin powder in an aqueous medium or to add an ammonium compound for the purpose of imparting adhesiveness to the molding material. However, the thermal decomposition temperature of these compounds is lower than the molding temperature of thermoplastic matrix resins in general use in industry. Thus, these compounds may be thermally decomposed and evaporated during molding, which may disadvantageously affect the mechanical performance of the resulting molded articles or the appearance of the molded articles.

Because all the water-soluble polymeric binders to be used according to the method (4) have lower thermal decomposition temperatures of about 200° C. to 250° C., the water-soluble polymeric binders are decomposed disadvantageously at the molding temperature of thermoplastic matrix resins in general industrial use, when the molding materials produced by the method are directly used for molding. Thus, adverse affects on the appearance and physical properties of the resulting molded articles may occur. Furthermore, method (4) is disadvantageous in that the molding process is more complex, because decomposition of the components decomposable at the molding temperature, such as the water-soluble polymeric binders, surfactant, ammonium compounds and the like in the molding material, is inevitable prior to or during molding.

The processes described in the aforementioned individual gazettes concerning method (4) have one objective to produce a molding material imparted with adhesiveness. The molding material thus imparted with adhesiveness is advantageous in that hardly any slippage in fiber orientation occurs in laminating the material together because the individual sheets of the material adhere to each other. Further, the material is particularly suitable for sheet winding because the material readily adheres to a core bar when wound up over the bar. One drawback of imparting adhesiveness is the inclusion of a solvent and the like and a process of evaporating the solvent and the like is therefore essential during a molding process as described above. Contrary to the advantage described above, the imparted adhesiveness per se causes laborious work in handling the resulting molding material. For example, the materials stick onto molds or stick to each other during a lay-up operation or the reinforcing fiber eventually deforms when the molding material, once attached, is pulled off and adjusted.

It is an object of the present invention to provide a molding material wherein a thermoplastic resin powder is fixed in a reinforcing continuous fiber bundle via a binder resin and a method for producing the material. More specifically, it is an object of the present invention to provide a molding material providing excellent characteristic features in molded articles as described in the following item (i) as well as excellent handleability as described in the following item (ii); and a method for producing such a material.

In other words, the objects of the present invention reside in providing:

(i) a molding material capable of giving good composite properties and appearance to molded articles, and a method for producing the molding material, wherein a dispersion of a highly dispersible thermoplastic resin powder can be applied to a reinforcing continuous fiber bundle, whereby the thermoplastic resin powder can be uniformly applied into between the individual fibers of the reinforcing continuous fiber bundle, and additionally the fiber content in the molding material can be increased; and concurrently (ii) a molding material with good handleability, which is non-adhesive and does not contain substantially any solvent for the binder resin, which is drapable, which is not susceptible to the dissociation of the thermoplastic resin powder or the splitting of the reinforcing fiber and which is improved in terms of bulkiness.

In addition to the objects (i) and (ii), another object of the present invention is to provide a molding material characterized in that the decomposition of a binder resin contained in the molding material can be suppressed during molding and that gas generation is negligible, and a method for producing such a molding material.

DISCLOSURE OF THE INVENTION

So as to overcome the problems of conventional molding materials as described above, the present invention comprises depositing a thermoplastic resin powder in between the individual fibers of a reinforcing continuous fiber bundle and applying a solution of a binder resin dissolved in a solvent to the resulting reinforcing continuous fiber bundle deposited with the thermoplastic resin powder, whereby the thermoplastic resin powder is held in between the individual fibers via the binder resin which concurrently works to bind the individual fibers together, and removing substantially all the solvent of the binder resin from the resulting binder resin-applied reinforcing continuous fiber bundle at a temperature not above the melting point or flow point of the thermoplastic resin powder.

The molding material of the present invention is a molding material produced by fixing the individual fibers of the reinforcing continuous fiber bundle together, fixing the individual fibers and the thermoplastic resin powder together, and fixing the individual thermoplastic resin powders together, all in a pin-point fashion via the binder resin, characterized in that the molding material is non-adhesive and drapable, with substantially no solvent contained therein.

The term "binding in a pin-point fashion" in the present specification means locally binding the individual fibers together, locally binding the fibers and the individual thermoplastic resin powders together, and locally binding the individual thermoplastic resin powders together, through the presence of the binder resin per se in a spot or line.

For such pin-point binding, the method for producing the molding material in accordance with the present invention includes firstly depositing a thermoplastic resin powder in between the individual fibers of a reinforcing continuous fiber bundle and applying a solution of a binder resin dissolved in a solvent to the fiber bundle. In contrast, if a thermoplastic resin powder dispersed in a binder resin solution is applied to a reinforcing fiber bundle, which is then dried until substantially no solvent of the binder resin is present therein, the resulting molding material has deteriorated drape properties. The reason possibly lies in that the initial application of the dispersion solution containing the binder resin potentially causes most of the fibers and thermoplastic resin powder to become embedded in or covered with the binder resin and that subsequent drying for considerably removing the solvent leaves the binder resin as a coating, whereby the individual fibers, the fibers and the thermoplastic resin powder, and the individual thermoplastic resin powders are independently fixed together in a rigid manner to make the entire structure rigid.

Another fundamental characteristic feature of the present invention is that the binder resin has a 5% weight decrement temperature above the melting point or flow point of the thermoplastic resin.

In this specification, the term "5% weight decrement temperature" means a temperature at which the initial mass of a polymer is decreased by 5% on a temperature vs. mass curve prepared by measuring the polymer under the TGA measuring conditions described below. The mass decrement under the TGA measuring conditions represents the thermal decomposition properties of the polymer measured. If a molding process is effected at a temperature above the 5% weight decrement temperature of the binder resin, the binder resin is decomposed, which significantly affects the moldability and material properties of the resulting molding material. For the molding material of the present invention, in contrast, a binder resin with a weight decrement within 5% during molding should be selected. Thus, adverse effects of the binder resin on the moldability and material properties are almost negligible in molding with the molding material of the present invention. Therefore, good composite properties and appearance can be imparted to the resulting molded articles.

In the present specification, the term "removing substantially all solvent" means decreasing the solvent in the molding material to a negligible amount by removing the solvent as much as possible, generally meaning decreasing the solvent to below 3% by weight, preferably below 1% by weight, in the molding material immediately after the process of removing the solvent. Furthermore, the terminology "containing substantially no solvent" means a state wherein the solvent in the molding material is decreased to a negligible amount by removing the solvent as much as possible. The content of atmospheric water spontaneously contained in the molding material is also encompassed within the terminology. Generally, the terminology means a solvent content of 5% by weight or less in the molding material.

Reinforcing Continuous Fiber Bundle

For the reinforcing continuous fiber bundle to be used in the molding material of the present invention, any fiber with heat resistance above the melting point or flow point of a thermoplastic resin powder and with greater rigidity is preferable, including carbon fiber, glass fiber, aramide fiber, boron fiber, SiC fiber, and alumina fiber. Carbon fiber is the most preferable with respect to specific strength and specific elasticity.

With regard to the form of the reinforcing continuous fiber bundle, strand (roving) materials, uni-directionally aligned sheet (UD) materials, and fabric materials of continuous fiber are suitable. Specifically, strand materials and UD materials are particularly preferable for the purpose of infiltrating a powdery thermoplastic resin, not only onto the surface of the reinforcing continuous fiber bundle but also into the inside thereof, because these materials have good splitting properties.

Thermoplastic Resin

The thermoplastic resin to be used as the matrix resin in the molding material of the present invention is a thermoplastic resin, crystalline or amorphous, having a melting point or flow point of 130° C. or higher, in particular, including polyethylene, polypropylene, polyvinyl chloride, polyamide, polystyrene, polycarbonate, polyether imide, polysulfone, polyether sulfone, polyether ether ketone, thermoplastic polyimide, aromatic polyamide, and aromatic polyester may be used. These may be used singly or in combination as a mixture of two or more thereof. Examples of thermoplastic resins to be used in the present invention are shown in Table 1 below.

TABLE 1

| Resin Name | Product Name | Glass Transition Point (°C.) | Melting Point (°C.) | Flow Point (°C.) | Manufacturer |
|---|---|---|---|---|---|
| Polypropylene (PP) | Showaroma | 85 | 167 | . . . | Showa Denko |
| Polyamide 6 (PA6) | Orgasol | 40~60 | 225 | . . . | ATO CHEM |
| Polycarbonate (PC) | Panlite L1300W | 145~150 | 240 | . . . | Teijin Chemical |
| Polyether imide (PEI) | Ultem 1000 | 217 | . . . | 320 | GE |
| Polyether sulfone (PES) | Victrex PES | 225 | . . . | 310 | ICI |
| Polyphenylene | Ryton | 88 | 285 | . . . | Philips |

TABLE 1-continued

| Resin Name | Product Name | Glass Transition Point (°C.) | Melting Point (°C.) | Flow Point (°C.) | Manufacturer |
|---|---|---|---|---|---|
| sulfide (PPS) | PPS | | | | |
| Polyether ether ketone (PEEK) | Victrex PEEK | 143 | 334 | ... | ICI |
| Thermoplastic polyimide | PIX | 250 | 388 | ... | Mitsui Toatsu Chemicals |

The flow point in Table 1 is a temperature measured according to ASTM D569-82, which serves as one of the indicators representing the flow initiation point of an amorphous thermoplastic resin.

The melting point in Table 1 is a melting temperature of crystal, determined by measuring the endothermic peak of a resin by means of a differential scanning calorimeter. The melting point is shown as one of the indicators representing the temperature at which a crystalline resin begins to flow.

The deposition (% by weight) of a thermoplastic resin powder on a reinforcing continuous fiber bundle is given by the formula: [thermoplastic resin powder in weight/(continuous fiber bundle in weight+thermoplastic resin powder in weight)×100]. For good mechanical performance of a molded article, the deposition is preferably 20 to 60% by weight, particularly preferably 30 to 50% by weight.

Binder Resin

The binder resin in accordance with the present invention is used to individually bind together, in pin-point contacts, the individual fibers of the reinforcing continuous fiber bundle, the individual fibers and the thermoplastic resin powders, and the individual thermoplastic resin powders, whereby the dissociation of the thermoplastic resin powder, as well as the splitting of the resulting molding material while handling, can be prevented. In other words, the molding material of the present invention has good handleability. If a thermoplastic resin powder dispersed in a dispersing medium is simply applied to a reinforcing continuous fiber bundle with no use of any binder resin followed by drying, the handleability of the resulting molding material is reduced because the thermoplastic resin powder is readily dissociated from the reinforcing continuous fiber bundle by an external force applied and because the fibers are readily split.

By dissolving a binder resin in a solvent and using the resin in such a state, the binder resin serves as a paste in fixing the thermoplastic resin powder onto the continuous fiber bundle. However, the solvent dissolving the binder resin should never dissolve or should only slightly dissolve the thermoplastic resin powder, which is essential for providing drape properties to the molding material.

The 5% weight decrement temperature of the binder resin of the present invention is required to be above the melting point or flow point of the thermoplastic resin powder. In other words, at the melting point or flow point of the thermoplastic resin powder, the weight decrement of the binder resin should be below 5% by weight, preferably 1% by weight. A 5% weight decrement temperature of the binder resin below the melting point or flow point of the thermoplastic resin powder induces deterioration of the matrix thermoplastic resin, due to the decomposition of gas components of the binder resin during molding, so that the number of the inner voids is increased in the molded articles due to the generation of the decomposition gases, which deteriorate the composite properties and, additionally, the appearance and properties of the resulting molded articles.

The weight decrement is measured by TGA measurement according to JIS K7120 (sample: prepreg; atmosphere: in air; flow rate: 50 ml/min; temperature elevation rate: 10° C./min)

The binder resin of the present invention should necessarily have heat resistance above the molding temperature of the molding material. The term "heat resistance above the molding temperature of the molding material" means heat resistance at a temperature higher than at least the melting point or flow point of the thermoplastic resin which is the matrix resin in the molding material. If the thermal resistance of the binder resin is poor, the binder resin is decomposed during molding, thereby damaging the appearance of the resulting molded articles due to the generation of the decomposition gases and inevitably causing the composite properties, such as physical and mechanical properties of the molded articles, to deteriorate.

The binder resin to be used in accordance with the present invention is grouped into non-cross-linking types and cross-linking types, both of which are soluble in water or alcohol. The binder resins of the cross-linking type are cross-linked with a cross-linking agent. Therefore, the molding material has better handleability because such a material characteristically is less hygroscopic in storage than that of the non-cross-linking type.

The type of binder resin used in accordance with the present invention should be selected depending on the type of the thermoplastic resin powder used as the matrix.

The binder resins of the non-cross-linking type to be used in accordance with the present invention generally include alcohol-soluble nylon resins which are produced by substituting the hydrogen of the amide group —CONH— in the polyamide resin with a methoxymethyl group —CH$_2$OCH$_3$—, and modified nylon resins (modified polyamide) such as water-soluble nylon. Other than the polyamide resin, the binder resins include polycarbonate resins, polyether imide resins, polyether sulfone resins, and polyether ether ketone resins.

From the viewpoint of softness (drape properties) of molding materials, particularly, modified nylon resins (modified polyamide resins) are preferable. Such modified nylon resins are commercially available from Teikoku Chemical Industry Co., Ltd. and MATSUMOTO YUSHI CO., LTD.

As the aforementioned polycarbonate resin, use may be made of those commercially available from MITSUBISHI GAS CHEMICAL CO., INC., Teijin Chemical Co., Ltd., Mitsubishi kasei Corp. Idemitsu Petroleum Chemical Co., Ltd., Nippon GE Plastics Co. Ltd., and BAYER JAPAN Co., Ltd. under the trade marks of Upilon, Panlite, Novalex, Idemitsu Polycarbonate, Zenoy, and Macrolon, respectively.

As the polyether imide resin, use may be made of a resin also commercially available from Nippon GE Plastics Co., Ltd. under the trade name of Ultem.

As the polyether sulfone resin, use may be made of a resin commercially available from ICI under the trade name of Victrex PES.

Examples of the binder resins of the non-cross-linking type to be used in accordance with the present invention are listedbelow in Table 2.

TABLE 2

| Resin Name | Product Name | Glass Transition Point (°C.) | Melting Point (°C.) | Flow Point (°C.) | 5% weight decrement temperature (°C.)*1 | Manufacturer |
|---|---|---|---|---|---|---|
| Polyvinyl alcohol (PVA) | Gosenol | 63~85 | 228 | ... | 290 | The Nippon Synthetic Chemical Industry |
| Polyethylene oxide (PEO) | — | | 66 | ... | 160 | Sumito Seika Chemicals |
| Alcohol-soluble nylon | Trejin | | 145 | ... | 310 | Teikoku Chemical Industry |
| Water-soluble nylon | BF207 | | 145 | ... | 330 | MATSUMOTO YUSHI |
| Polycarbonate (PC) | Panlit L1300W | 145~150 | 240 | ... | 420 | Teijin Chemical |
| Polyether sulfone (PES) | Victrex PES | 225 | ... | 310 | 530 | ICI |
| Polyether imide (PEI) | Ultem 1000 | 217 | ... | 320 | 560 | GE |

*1: Conditions for TGA measurement: sample: dry resin; atmosphere: in air; flow rate: 50 ml/min; temperature elevation rate: 10° C. min.

The binder resins of the cross-linking type to be used in accordance with the present invention include polyamide and polyester resins, to which are preliminarily added cross-linking agents. The cross-linking agents include melamine and derivatives thereof, organic acids, and epoxy resins.

The melamine derivatives to be used as the cross-linking agent in accordance with the present invention include cyanuramide, cyanuric acid trimide cyanuric acid amide, and 2,4,6-triamino-1,3,5-triazine; the derivatives thereof include picrate [$C_3H_6N_6 \cdot C_3H_3N_7$], and tribenzoyl compounds [$C_3 11_3$ ($CHCOC_6H_5$)].

The organic acids to be used as the cross-linking agent in accordance with the present invention include citric acid, itaconic acid, glutaric acid, adipic acid, azelaic acid, oxalic acid, succinic acid, glycolic acid, malonic acid, crotonic acid, lactic acid, maleic acid, tartaric acid, and hypophosphite.

As the epoxy resin to be used as the cross-linking agent in accordance with the present invention, either one of glycidyl ether type-epoxy (phenol series) or glycidyl ether type-epoxy (alcohol series) may be satisfactory.

The glycidyl ether type-epoxy (phenol series) includes bisphenol A type, bisphenol F type, bisphenol AD type, bisphenol S type, 2, 6-xylenol type, phenol novolak type, o-cresol novolak type, trifunctional type, and tetraphenylol ethane type.

The glycidyl ether type-epoxy (alcohol series) includes polyethylene glycol type, polypropylene glycol type, neopentyl glycol type, 1,6-hexane diol type, trimethylol propane type, propylene oxide bisphenol A type, and hydrogenated bisphenol A type.

For the purpose of promoting the cross-linking rate of a binder resin of the cross-linking type, an amine catalyst is further used in combination with these cross-linking agents described above.

As other binder resins, use may be made of thermosetting resins of polyimide resins and bismaleimide resins.

Other Components

If needed, the molding material of the present invention may satisfactorily be blended with fillers such as talc, calcium carbonate, and silica; plasticizers such as phthalate, fatty acid ester, and phosphate; thermal stabilizers such as tin compounds and higher fatty acids; or coloring agents.

Characteristic Features of the Molding Material

Since a binder resin binds locally between the reinforcing continuous fiber bundle and the thermoplastic resin powder, between the individual reinforcing continuous fiber bundles and between the individual thermoplastic resin powders, in a pin-point fashion, in the molding material of the present invention, whereby the dissociation of the thermoplastic resin powder and the splitting of the reinforcing continuous fiber bundle can be suppressed effectively, the molding material has good handleability because the molding material can hold its entire form in a stable manner.

The percentage of binder resin by weight in the molding material of the present invention is represented by the formula: [binder resin in weight/(continuous fiber bundle in weight+thermoplastic resin powder in weight+binder resin in weight)×100], and is preferably 0.1 to 10% by weight, so as to prevent the dissociation of the thermoplastic resin powder and to appropriately procure the bundling effect of the reinforcing continuous fiber bundle.

The molding material of the present invention is non-adhesive because the molding material is sufficiently dried so that none of the solvent of the binder resin is present in the molding material during the production process. Thus, the molding material of the present invention has great handleability during lay-up work for molding.

Because in the molding material of the present invention the binder resin binds locally between the individual fibers of the reinforcing continuous fiber bundle, between the reinforcing continuous fiber bundle and the thermoplastic resin powder, and between the individual thermoplastic resin powders, in a pin-point fashion, no matrix layer is formed and the molding material has some degree of freedom, in addition to the form stability described above. The molding material is readily deformable by an external force or, in other words, the material is drapable.

Such drape properties may be represented by bending rigidity, which can be tested according to ASTM D1388. The value is less than 10,000 mg·cm, preferably less than 5,000 mg·cm, and more preferably less than 3,000 mg·cm. A value for drape above 10,000 mg·cm causes difficulty in laying up the molding material on a part with a small curvature.

The molding material of the present invention is preliminarily dried and is non-adhesive because the solvent content in the molded articles is 5% by weight or less. As one method for measuring the adhesiveness of the molding material of the present invention, the tack testing method of a prepreg, defined in JIS K7071, is used. By the method the resultant value is 0 cN, indicating that the molding material is absolutely free of any adhesiveness.

The bulk factor of the molding material of the present invention is 100% or less, preferably 50% or less and more preferably 30% or less. If the bulk factor is above 100%, the molding material laid up in a mold or the like prior to molding turns so bulky that the difference from the dimension and shape of the final product is so large as to cause difficulty in designing molds therefor. Particularly, if the difference in volume between prior to and after molding is large, which unavoidably involves the winding of the reinforcing continuous fiber bundle in the final product, it becomes difficult to produce a product with excellent properties because voids are highly likely to remain.

The bulkiness (bulk factor) of the molding material of the present invention is simply assessed by the following formula (1):

$$\text{Bulk factor } (\%) = (D0-D1)/D0 \times 100 \quad \text{Formula (1).}$$

In the formula (1), "DO" represents the thickness (mm) of each sheet of the molding material; and "D1" represents the thickness (mm) of each sheet of the molding material in its void free state after molding, which is calculated by the following formula (2):

$$D1 = [(W/1000 \times \rho) \times n/Vf] \times 100 \quad \text{Formula (2).}$$

In the formula (2), "W" represents the weight of the continuous fiber bundle per unit area (g/m$^2$); "ρ" represents the density (g/cm$^3$) of the continuous fiber bundle; n represents the number of the molding materials laid up; and "Vf" represents the content (%) of the fiber volume in the resulting molded plate.

Method for Producing the Molding Material

The method for producing the molding material in accordance with the present invention is a powder method as described above.

The method for producing the molding material in accordance with the present invention comprises depositing a thermoplastic resin powder in between the individual fibers of a reinforcing continuous fiber bundle and applying a solution of a binder resin dissolved in a solvent to the resulting reinforcing continuous fiber bundle containing the thermoplastic resin powder, whereby the thermoplastic resin powder is fixed in between the individual fibers via the binder resin which concurrently works to bind the individual fibers together, and removing substantially all the solvent of the binder resin after application to the reinforcing continuous fiber bundle at a temperature not above the melting point or flow point of the thermoplastic resin powder.

In accordance with the present invention, molding material is provided which contains substantially no solvent, is non-adhesive and drapable, and which is produced by applying a binder resin solution to a reinforcing continuous fiber bundle on which a thermoplastic resin powder has been deposited and subsequently removing the solvent of the applied binder resin by sufficient drying, thereby fixing the individual fibers of the reinforcing continuous fiber bundle together, fixing the individual fibers and the thermoplastic resin powder together, and fixing the individual thermoplastic resin powders together, all in a pin-point fashion, via the binder resin. If a reinforcing continuous fiber bundle with a deposited thermoplastic resin powder from which the dispersing medium has been evaporated, is not treated by application of a binder resin solution thereto, the thermoplastic resin powder is readily dissociated from the reinforcing continuous fiber bundle by an external force.

The method for producing the molding material of the present invention will now be described below in detail.

For improving handleability and physical properties, a bundling agent is deposited onto the surface of the fibers of reinforcing continuous fiber bundles commercially available. When the reinforcing continuous fiber is a carbon fiber, for example, a bundling agent principally comprising an epoxy resin is frequently used. As bundling agents besides the epoxy resin, use may be made of soluble polyamide, polyvinyl pyrrolidone, or polyvinyl alcohol.

According to the method for producing the molding material of the present invention, such bundling agents may satisfactorily be deposited to some extent without disturbing stable production of the material. For the purpose of fixing the thermoplastic resin powder bnto the reinforcing continuous fiber bundle in a stable manner and providing drape to the resulting molding material, however, it is preferable that no bundling agent be deposited because any bundling agent generally disturbs the splitting of the reinforcing continuous fiber bundle and suppresses the infiltration of the thermoplastic resin powder into the reinforcing continuous fiber bundle.

According to the method for producing the molding material of the present invention, a reinforcing continuous fiber bundle should first be subjected to a treatment for removing a bundling agent if present, whereby the bundling agent can be eliminated from the reinforcing continuous fiber bundle.

The treatments for removing bundling agents include a calcination process and a solvent process. Any of these processes may be selected and used singly or in combination in accordance with the present invention. For example, firstly, 90% or more of a bundling agent should be removed through heating and calcination of the reinforcing continuous fiber bundle in a first stage; and, in a second stage, the bundling agent still remaining is removed by means of a solvent, which also serves the purpose of washing and splitting the reinforcing continuous fiber bundle. Such a combination is effective.

So as to achieve uniform deposition of the thermoplastic resin onto the reinforcing continuous fiber bundle, the thermoplastic resin should necessarily be in powder form.

The average particle size of such a thermoplastic resin powder is 50 μm or less, more preferably 10 μm or less. If the average particle size of the thermoplastic resin powder is above 50 μm, uniform distribution thereof inbetween the individual fibers is hardly achieved. Simultaneously, the average particle size of the thermoplastic resin powder is preferably not below 1 μm. If the average particle size is below 1 μm, the particles aggregate, causing difficulty in uniform distribution of the thermoplastic resin.

In order that the thermoplastic resin power can readily infiltrate inbetween the fibers, the largest particle size thereof is preferably not above 150 μm, more preferably 100 μm or less and most preferably 80 μm or less. If the largest particle size of the thermoplastic resin powder is above 150 μm, the thermoplastic resin powder infiltrates in between the individual reinforcing continuous fiber bundles with much difficulty, so the powder is localized on the outermost layer near the surface of the reinforcing continuous fiber bundle, which induces apertures in the reinforcing continuous fiber bundle upon rubbing of the powder by contact with the guide bar in manufacturing, frequently causing quality problems.

The particle size of the thermoplastic resin powder may be measured using commercially available laser diffraction systems and the like.

Generally, thermoplastic resins are commercially available in the form of pellet, granule, powder or the like, and any such resin with a particle size satisfying the particle size range (condition) may be used in accordance with the present invention. Using general pulverization techniques, for example, known grinding or particle preparation techniques such as medium mill or impact grinding or grinding at extremely low temperature, thermoplastic resins are pulverized to meet the particle conditions described above, and may also be used in accordance with the present invention.

So as to deposit the thermoplastic resin powder onto the individual reinforcing continuous fiber bundles, use may be made of a dry method or wet method or the combination thereof. As the dry method, use may be made of the fluidized bed method, the electrostatic deposition method, and the like. As the wet method, on the other hand, use may be made of the suspension method comprising immersing a reinforcing continuous fiber bundle in a dispersion medium containing dispersed therein a thermoplastic resin powder, to consequently deposit the thermoplastic resin powder onto the fiber bundle, and the like.

For the purpose of increasing the deposition of the thermoplastic resin powder onto the reinforcing continuous fiber bundle, for the purpose of decreasing the damage of the reinforcing continuous fiber bundle during the production process, and for the purpose of simplifying the deposition apparatus, the suspension method for deposition of the thermoplastic resin powder is more preferable.

For the suspension method, use may be made of, for example, water, alcohols, ketones, halogenated hydrocarbons or a mixture thereof as the liquid (dispersing medium) for dispersing the thermoplastic resin powder. Because of fluid stability in particular, water is preferably used as a dispersing medium for dispersing the thermoplastic resin powder at a higher concentration. Because alcohols and ketones split the reinforcing continuous fiber bundle well, furthermore, these media are preferable to uniformly deposit the thermoplastic resin powder in a dispersion solution at a lower concentration.

The dispersion solution contains a dispersing medium and the thermoplastic resin powder, without any binder resin contained therein. Thus, the increase in viscosity, as is observed for prior-art dispersion solutions of thermoplastic resin powders in a binder resin solution, is avoided in use of the dispersion solution in accordance with the present invention. Due to the low viscosity, the thermoplastic resin powder can be infiltrated deeply inside the reinforcing continuous fiber bundle to achieve the uniform deposition of the resin powder.

So as to effectively disperse the thermoplastic resin powder, the dispersion solution may be agitated by means of an agitator or a high-pressure pump.

The dispersion medium may sometimes contain a surfactant for the purpose of augmenting the dispersion of the thermoplastic resin powder. Preferably, however, the medium does not contain any surfactant in view of the aforementioned objects of the present invention, if possible, because surfactants generally have low heat-resistant temperatures and decompose into gas, which may then adversely affect the resulting molded articles during subsequent processing.

The concentration of the thermoplastic resin in the dispersion solution [thermoplastic resin powder in weight/(dispersing medium in weight+thermoplastic resin powder in weight)×100], may by appropriately selected, depending on the particle size of the thermoplastic resin powder to be used, the surface form of the resin, the type of the dispersion medium, the temperature of the dispersion solution, the operation velocity and the like, but generally, the concentration is 1 to 50% by weight, preferably 1 to 30% by weight, and more preferably 5 to 15% by weight.

If the thermoplastic resin concentration is less than 1% by weight in the dispersion solution, the deposition of the resin powder onto the reinforcing continuous fiber bundle is so slight that a predetermined resin level cannot be reached. Therefore, a great number of defects such as voids may develop inside the resulting molded articles, with consequent lack of recovery of good molded articles.

If the thermoplastic resin concentration is above 50% by weight in the dispersion solution, the infiltration of the powdery resin into the reinforcing continuous fiber bundle is then difficult and breakage of the monofilaments in the reinforcing continuous fiber bundle frequently occurs when in contact with the guide bar in a high-concentration bath, which is highly likely to generate fluff.

The temperature of the dispersion solution of the thermoplastic resin powder should be a temperature appropriate to retain the dispersion state well, and varies depending on the type and concentration of the thermoplastic resin to be used. Generally, the temperature is 5 to 50° C., preferably 5 to 30° C. and more preferably 15 to 30° C.

If the temperature of the dispersion solution is above 50° C. the fluid stability may be lost due to the evaporation of the dispersing medium and the like, which increases the variation in the concentration of the dispersion solution.

To deposit the thermoplastic resin powder onto the reinforcing continuous fiber bundle by the suspension method, the reinforcing continuous fiber bundle is immersed in the dispersion solution of the thermoplastic resin powder or the reinforcing continuous fiber bundle is contacted with the dispersion solution in counter-current flow. So as to avoid the fiber bundle turning fluffy during immersion, the reinforcing continuous fiber bundle is immersed in a dispersing medium, preferably under such a tension that the fiber bundle won't be loose. The period of such immersion should be adjusted, depending on the deposition of the thermoplastic resin powder, and generally the reinforcing continuous fiber bundle should be immersed in the dispersion solution for 5 to 180 seconds.

The thermoplastic resin powder, which is preliminarily deposited onto the reinforcing continuous fiber bundle and from which is then removed the dispersing medium, is readily dissociated from the reinforcing continuous fiber bundle by an external force. So as to prevent the dissociation of the thermoplastic resin powder in accordance with the present invention, on the contrary, a binder resin solution is applied to the reinforcing continuous fiber bundle in a dried state containing the thermoplastic resin powder and subsequently, the solvent in the applied binder resin is removed by evaporation.

By such timing of application of a binder resin, components decomposable during molding, such as a surfactant, which conventionally has been used to disperse thermoplastic resin powders, need not by added to the dispersion solution of the thermoplastic resin powder. Thus, the molding material produced by the method of the present invention is given uniformity, non-adhesiveness, drape, low bulk and good handleability. In molded articles molded from the molding material produced by the method of the present invention, the matrix resin is uniform and contains no component decomposable during molding. Therefore, the molded articles have great bending strength, high bending elasticity modulus, and good composite properties such as LISS, and additionally, the molded articles have good appearance.

In accordance with the present invention, it is required that the binder resin solution does not dissolve the thermoplastic resin powder or only slightly dissolves the resin powder. If use is made of a binder resin solution in which the thermoplastic resin powder is soluble, the thermoplastic resin powder deposited at a given amount onto the reinforcing continuous fiber bundle may be dissolved in the binder resin solution, causing difficulty in the adjustment of the amount of deposition of the resin, which not only increases the concentration of the thermoplastic resin in the binder bath but also solubilizes the thermoplastic resin powder deposited on the reinforcing continuous fiber bundle, to partially form a matrix layer and thereby damage the drape. Thus, the objective molding material of the present invention cannot be produced.

Furthermore, higher solubility is generally the result when the solubility parameter (SP) of a resin has a value close to the value of the solubility parameter of a fluid; on the contrary, the term "slight solubility" means that a resin either swells or is insoluble in the solution, i.e. a situation wherein the SP value of the resin is greatly different from the SP value of the fluid.

In accordance with the present invention, a fluid (solvent) which dissolves the binder resin should be selected taking into consideration the thermoplastic resin powder and binder resin to be used. Generally, use may be made of, for example, water, alcohols, ketones, halogenated hydrocarbons, nitrogen-containing compounds or a mixture solution thereof.

As the solvent to be used in the method for producing the molding material of the present invention, for example, use may be made of water (SP value of 23.4), and alcohols such as methanol (SP value of 14.8) and ethanol (SP value of 12.8), for a polypropylene resin (SP value of 8.1) and a polycarbonate resin (SP value of 9.8).

Many of thermoplastic resins have SP values of about 6 to 12. Water and alcohols have larger SP values. Therefore, many of thermoplastic resins are generally slightly soluble in water and alcohols. Thus, water and alcohols may be used in wider ranges, and are thus preferable as the solvents for binder resins in accordance with the present invention.

A polycarbonate resin, polyether imide resin and polyether sulfone resin are used as such binder resins because all these resins are highly soluble in chloride solvents such as methylene chloride or in a mixed solution of N,N-dimethylformamide or N-methyl-2-pyrrolidone with methylene chloride.

The concentration of the binder resin solution used for producing the molding material of the present invention, [binder resin in weight/(dispersing medium in weight+ binder resin in weight)×100], is 0.01 to 2% by weight, preferably 0.01 to 0.1% by weight. If the concentration of the binder resin solution bath is above 2% by weight, the deposition of the binder resin is so high as to adversely affect the mechanical properties of the final product. Below 0.01% by weight, the concentration is too low to fix the thermoplastic resin powder. In that case, the dissociation of the resin powder from the reinforcing continuous fiber bundle is significant.

In the method for producing the molding material of the present invention, the pH of the binder resin solution has no specific limitation, but generally, an appropriate amount of a pH-adjusting agent may be added to the solution to give a final pH of about 6 to 8.

In the method for producing the molding material of the present invention, the temperature of the binder resin solution may satisfactorily be a temperature appropriate to keep the binder resin well dissolved, which temperature varies depending on the type and concentration of the resin used.

Generally, the temperature is 5 to 50° C., preferably 5 to 30° C. and more preferably 15 to 30° C. If the temperature of the binder resin solution is above 50° C., the fluid stability is lost due to the evaporation of the dispersing medium and the like, which causes significant variation of the concentration of the binder resin solution.

In the method for producing the molding material of the present invention, the application of the binder resin solution essentially should be conducted after the thermoplastic resin powder has been deposited in between the individual reinforcing fiber bundles.

The processes for applying the binder resin solution to the reinforcing continuous fiber bundle include a process of immersing the reinforcing continuous fiber bundle preliminarily deposited with the thermoplastic resin powder in the binder resin solution; a process of jetting the binder resin solution onto the reinforcing continuous fiber bundle preliminarily deposited with the thermoplastic resin powder; and a kiss-roll (partial contact) process comprising putting the reinforcing continuous fiber bundle preliminarily deposited with the thermoplastic resin powder in partial contact with the top of a rotating roller, the roller being arranged in the binder resin solution and projecting above the surface of the binder resin solution.

For the immersion process, the immersion of the reinforcing continuous fiber bundle deposited with the thermoplastic resin powder is preferably carried out under such a tension that the fiber bundle won't be loose, so as to avoid the fiber bundle turning fluffy during the immersion in the dispersing medium. So as to more effectively apply the binder resin solution between the fibers, the reinforcing continuous fiber bundle is preferably passed in contact with at least one guide bar. The period of such immersion should be adjusted to a given quantity of binder resin deposition, which is generally 5 to 60 seconds. According to the method for producing the molding material by the immersion process, the deposition of the binder resin solution inbetween the individual fibers can be more effectively achieved.

In the kiss-roll process, the reinforcing continuous fiber bundle preliminarily deposited with the thermoplastic resin powder is passed over and in contact with the surface of at least one rotating roller arranged in the binder resin solution. During rotation, the rotating rollers take up the binder resin solution, to enable the transfer and subsequent applying of the binder resin while the reinforcing continuous fiber bundle is in contact with the rotating rollers. The duration of the contact of the reinforcing continuous fiber bundle with the rotating rollers should be adjusted to provide a given quantity of binder resin deposition, which is generally 5 to 60 seconds. Therefore, the concentration of the binder resin solution, the velocity of the rotating rollers and the velocity of the lines should be controlled. By the kiss-roll process, the amount (level) of the binder resin can be adjusted in a relatively simple manner.

In the jetting process, the binder resin solution from at least one jet arranged inside a sealed room is sprayed onto the reinforcing continuous fiber bundle, preliminarily deposited with the thermoplastic resin powder, as it passes through the room. The time of jetting onto the reinforcing continuous fiber bundle is adjusted to provide a given quantity of binder resin deposition, which is generally 5 to 60 seconds. Therefore, the jetting time, the concentration of the binder resin solution, the line velocity and the like should be controlled. No disturbance by guide bars or the like is present in the jetting region of the sealed room. Thus, the reinforcing continuous fiber bundle can pass through the region nearly linearly, whereby the dissociation of the thermoplastic resin powder via an external force can be prevented. By the present jetting process, the adjustment of the binder resin level can be readily substantially attained while suppressing the dissociation of the thermoplastic resin powder.

By subsequently sufficiently drying the reinforcing continuous fiber bundle material, containing the thermoplastic resin powder, the binder resin and the solvent of the binder resin, at a temperature lower than the melting point or flow point of the powdery thermoplastic resin until substantially no solvent remains in the material, the molding material of the present invention can be produced. If the drying temperature is above the melting point or flow point of the thermoplastic resin powder, the powdery thermoplastic resin is melted to form a matrix layer, whereby the material loses drape and the objective molding material is not produced. The duration of such a drying process varies depending on the type of the solvent to be used and the temperature of the drying process. The process is generally complete in 5 to 60 seconds.

BEST MODES FOR CARRYING OUT THE INVENTION

Preferred embodiments of the present invention will now be described with reference to the drawings.

In the following examples of the present invention, the suspension method is selected as the method for dispersing a thermoplastic resin powder; and the immersion process is selected as means to apply a binder resin. However, any of the individual methods and processes previously described may be used in accordance with the present invention. Therefore, it is not intended to limit the present invention to only the method and process used in the following examples.

Figure 1:
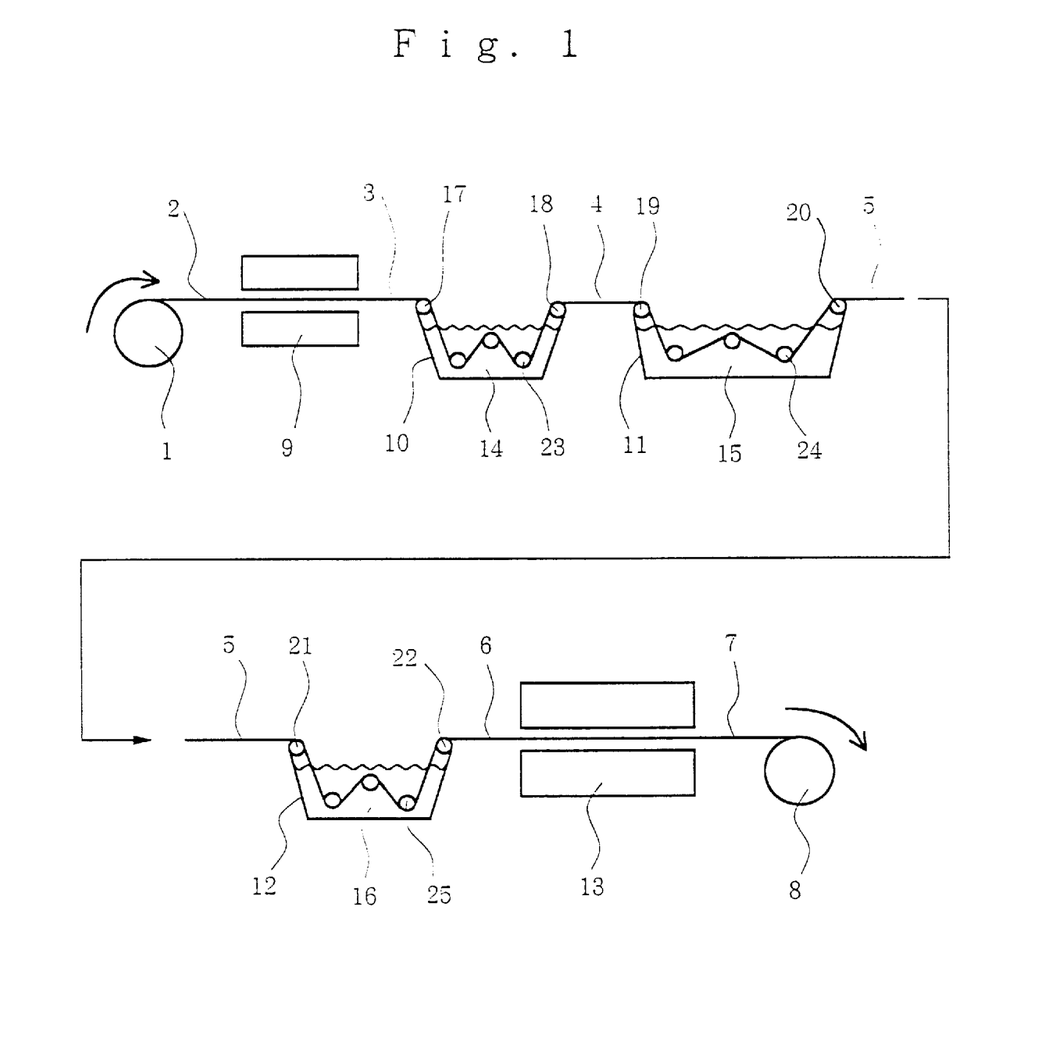
FIG. 1 is a schematic view depicting one example of a preferred embodiment of a system to be used in accordance with the method of the present invention.

In FIG. 1, a continuous carbon fiber bundle 2 released from a bobbin 1 passes through an oven 9 arranged to remove a bundling agent deposited on the continuous carbon fiber bundle 2, where the bundling agent is removed under heating to recover a continuous carbon fiber bundle 3 substantially free of any bundling agent. The continuous carbon fiber bundle 3 passing over a guide roller 17 is introduced into a washing bath tank 10 containing a washing solution 14 to wash and split the continuous carbon fiber bundle 3.

The continuous carbon fiber bundle 3 is preliminarily treated therein. More specifically, by washing off impurities deposited or remaining on the continuous carbon fiber bundle 3 and concurrently widely spreading the fiber bundle 3 by guide bars 23 and then passing the fiber bundle 3 over a guide roller 18, the continuous carbon fiber bundle 4 is prepared.

Then, the preliminarily treated continuous carbon fiber bundle 4 passing over a guide roller 19 is introduced into a dispersing bath tank 11. A dispersion solution 15 of a thermoplastic resin powder adjusted to a given concentration is contained in the dispersing bath tank 11. The continuous carbon fiber bundle 4 is immersed in the dispersion solution 15 of the thermoplastic resin powder and is then passed around guide bars 24 to deposit the thermoplastic resin powder inbetween the individual fibers.

The continuous carbon fiber bundle 5, in which the thermoplastic resin powder is deposited inbetween the individual fibers thereof, passes over a guide roller 20, is then drawn out from the dispersion solution 15, and is then passed over a guide roller 21 for introduction into a binder bath 12.

In the binder bath 12 containing a binder resin solution 16 adjusted to a given concentration, the continuous carbon fiber bundle 5 is immersed in the binder resin solution 16. Subsequently, the continuous carbon fiber bundle 5 passes around guide bars 25, while the thermoplastic resin powder is bonded the binder resin inbetween the monofilaments of the carbon fiber.

The continuous carbon fiber bundle 6, in which the thermoplastic resin powder is bonded through the binder resin inbetween the individual fibers, is drawn out from the binder resin solution 16, and then, the fiber bundle 6 passes over a guide roller 22 to be introduced into a dryer 13, temperature-controlled within a temperature range not above the boiling point of the solvent of the binder resin solution 16 and the melting point or flow point of the thermoplastic resin powder.

From the continuous carbon fiber bundle 6 thus treated, the solvent is substantially removed in the dryer 13, to prepare a molding material 7 with the thermoplastic resin functioning therein as the matrix resin and with drape. Subsequently, the molding material is wound up on a winder 8.

The present invention will now be described more specifically in the following examples below.

In the individual examples and comparative examples, bending strength and bending elasticity modulus were determined according to ASTM D790. Further, ILSS was assessed according to ASTM D2344; and drape properties were examined according to ASTM D1388.

Examples 1 to 10 represent an embodiment of the molding material containing a non-cross-linking-type binder resin; and Examples 11 and 12 represent an embodiment of the molding material containing a cross-linking-type binder resin.

EXAMPLE 1

The molding material of Example 1 was produced, using the system shown in FIG. 1 by the following procedures.

A carbon fiber bundle 2 (strength: 420 kgf/mm$^2$; elasticity modulus: 24,500 kgf/mm$^2$; diameter of monofilament: 7 μm; density: 1.77 g/cm$^3$; bundle of 12,000 filaments; an epoxy bundling agent) was passed through the oven 9 adjusted to 400° C., and was then introduced into the washing solution 14 containing acetone. Subsequently, the fiber bundle was passed through the dispersion solution 15 where a polyamide resin powder (Product name: Organol, manufactured by ATO CHEM Co. melting point of 225° C.) was suspended in an acetone dispersing medium and adjusted to 25% by weight, and was then passed through the binder resin solution 16 prepared by adjusting an alcohol-soluble polyamide resin (Product name: Trejin, manufactured by Teikoku Chemical Industry Co., Ltd.; 5% weight decrement temperature of 310° C.) to a solids concentration of 0.02% by weight by means of methanol. Subsequently, the fiber bundle was introduced into the dryer 13 controlled to 100° C. After operating the system of FIG. 1 at a velocity of 1 m/min for about 10 minutes and then operating the system for about another 10 minutes, a molding material of about 10 m was recovered for sample testing.

Figure 2:
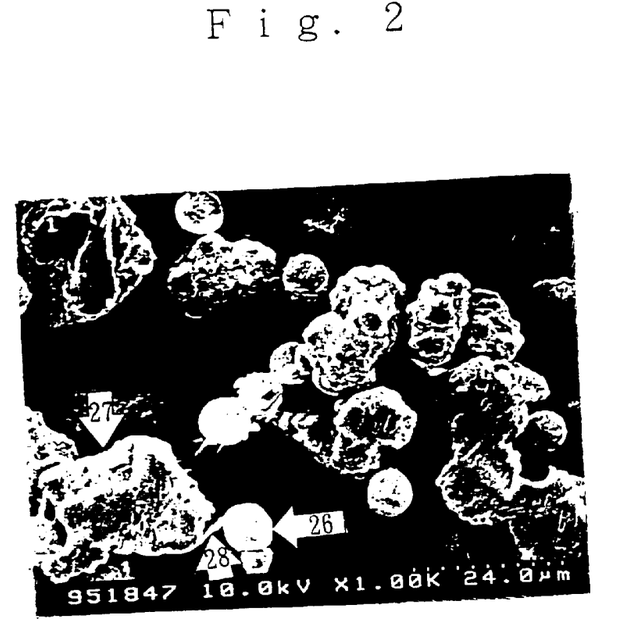
FIG. 2 depicts a representative state of bonding in a molding material product of the present invention, in a cross-sectional SEM (scanning electron microscope) photograph of the "fiber form" thereof.
Figure 3:
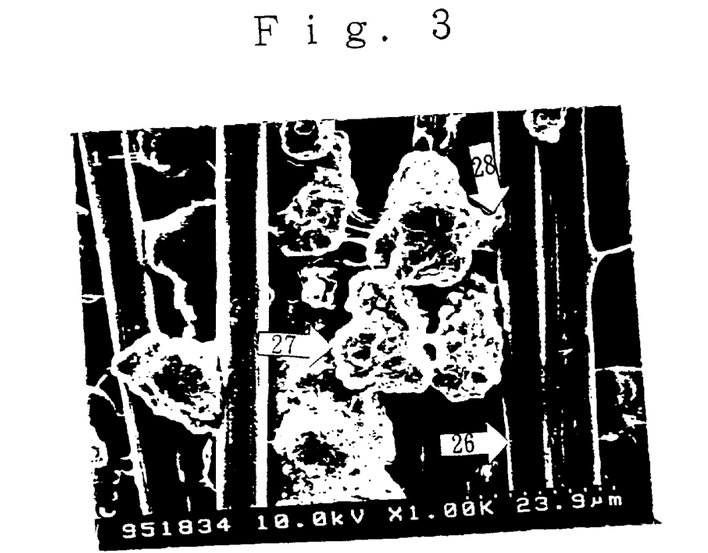
FIG. 3 depicts a representative state of bonding in a molding material product of the present invention, in a side-elevation SEM (scanning electron microscope) photograph of the "fiber form" thereof.

SEM photographs of representative cross-section and the side elevation of the molding material of Example 1 are shown in FIGS. 2 and 3. FIGS. 2 and 3 indicate that the thermoplastic resin powder 27 is fixed through the binder resin 28 onto the carbon fiber 26 in a pin-point fashion; the individual carbon fibers 26, 26 are fixed together similarly through the binder resin 28; and the individual thermoplastic resin powders 27, 27 are similarly fixed together through the binder resin 28. The resulting molding material was tested for its drape properties. The results of the test are such that the value of the drape properties was 400 mg·cm, which indicates that the molding material was well drapable. The molding material of Example 1 has a tape-like shape, with a bulk factor of 32%. The molding material had extremely good handleability with no dissociation of the resin powder from the molding material, with no splitting of the fibers and without adhesiveness. The resin content was 31% by weight.

By winding the tape-like molding material of Example 1 on a plate of 300 mm×300 mm, a uni-directional sheet of a carbon fiber content of 150 g/m² was prepared. The uni-directional sheet was molded under the conditions shown in Table 5, to prepare a resin-impregnated sheet. The resin-impregnated sheet was cut into pieces of 100 mm×150 mm. The pieces were laminated at 14 ply, from which was prepared a uni-directional laminated plate of a fiber volume content of 60%, by compression molding in molds by means of a matched die. The conditions for producing the molding material are shown in Tables 3 and 4 below. The properties of the molding material and the resulting laminated plate are shown in Tables 5 and 6 below.

EXAMPLE 2

The same method as in Example 1 was carried out, except for the use of the polycarbonate resin shown in Table 1 as the thermoplastic resin powder as well as ethanol as the dispersing medium. The process conditions and the properties of the resulting molding material and laminated plate are shown in Tables 3 and 5 below.

EXAMPLE 3

The same method as in Example 1 was carried out, except for the use of a glass fiber bundle (strength: 350 kgf/mm² elasticity modulus: 7,400 kgf/mm²; monofilament diameter: 10 μm; density 2.49 g/cm³) bundled with a silane finishing agent, omission of use of the oven 9 or washing bath tank 10 to remove the bundling agent, and the use of the polypropylene resin shown in Table 1 above as the thermoplastic resin powder. The conditions for such production and the properties of the resulting molding material and laminated plate are shown in Tables 3 and 5 below.

EXAMPLE 4

The same method as in Example 1 was carried out, except for the use of an aramide fiber bundle (strength: 280 kgf/mm² elasticity modulus: 6,000 kgf/mm²; monofilament diameter: 12 μm; density: 1.44 g/cm³) and the use of the conditions for removing the bundling agent shown in Table 3 below. The conditions for such production and the properties of the resulting molding material and laminated plate are shown in Tables 3 and 5 below.

EXAMPLES 5 and 6

Forty carbon fiber bundles which were the same as those used in Example 1 were preliminarily aligned and then passed through the system shown in FIG. 1. The thermoplastic resins (polyether imide and polyether sulfone), shown in Table 1 above, were ground to particle sizes shown in Tables 3 and 4 below. The resulting thermoplastic resin powders were suspended in dispersing media shown in Tables 3 and 4 below, to prepare concentration-adjusted dispersion solutions. The dispersion solutions were placed in the dispersion bath tank 11. Subsequently, various binder resin solutions of the water-soluble nylon resin shown in Table 2 were prepared, in which the solids contents were adjusted with pure water to those shown in Tables 3 and 4 below. Then, the binder solutions were placed in the binder bath tank 12 shown in FIG. 1. Then, acetone was charged into the washing bath tank 10. While adjusting the oven 9 to remove the bundling agent to 400° C., the dryer 13 was adjusted to 140° C. After operating the system of FIG. 1 at a velocity of 1 m/min for about 10 minutes and then operating the system for about another 5 minutes, a uni-directional resin sheet of about 200-mm width and with a carbon fiber content of 150 g/m² and a resin content of 30% by weight was recovered for sample testing. The conditions for such production and the properties of the molding materials are shown in Tables 3 to 6.

The uni-directional sheets of Examples 5 and 6 were cut into pieces of a size of 100×150 mm, 14 plies of which were then laminated together to prepare uni-directional molding plates with a fiber volume content of 60%, by compression molding in molds by means of a matched die. The properties of the resulting laminated plates are shown in Tables 5 and 6.

EXAMPLE 7

The same method as in Examples 5 and 6 was carried out, except for the use of the polyphenylene sulfide resin powder shown in Table 1 above as the thermoplastic resin powder, a mixed solution of acetone and methyl cellosolve as the dispersing medium, a polycarbonate resin as the binder resin and a mixed solution of methylene chloride and dimethylformamide as the solvent of the binder solution. The conditions for such production and the properties of the resulting molding material and laminated plate are shown in Tables 4 and 6 below.

EXAMPLE 8

The same method as in Examples 5 and 6 was carried out, except for the use of the polyether ether ketone resin powder shown in Table 1 above as the thermoplastic resin powder, acetone as the dispersing medium, a polyether sulfone resin as the binder resin, and a mixed solvent of methylene chloride and N-methyl 2-pyrrolidone as the solvent of the binder solution. The conditions for such production and the properties of the resulting molding material and laminated plate are shown in Tables 4 and 6 below.

EXAMPLE 9

The same method as in Examples 5 and 6 was carried out, except for the use of a mixture of two resin powders, the polyphenylene sulfide resin powder and polycarbonate resin powder shown in Table 1 above as the thermoplastic resin powder and the use of a water-soluble nylon resin as the binder resin. The conditions for such production and the properties of the resulting molding material and laminated plate are shown in Tables 4 and 6 below.

EXAMPLE 10

The same method as in Examples 5 and 6 was carried out, except for the use of a mixture of two resin powders shown in Table 1 above as the thermoplastic resin powder, namely the thermoplastic polyimide resin powder and polyether ether ketone resin powder, a mixed solution of methyl ethyl ketone and ethanol as the dispersing medium, a polyether imide resin as the binder resin, and methylene chloride as the solvent of the binder solution. The conditions and the properties of the resulting molding material and laminated plate are shown in Tables 4 and 6 below.

TABLE 3

| Example | | 1 | 2 | 3 | 4 | 5 |
|---|---|---|---|---|---|---|
| Reinforcing fiber (A) | | Carbon fiber | Carbon fiber | Glass fiber | Aramide fiber | Carbon fiber |
| Bundling conditions | | | | | | |
| Type of bundling agent | | Epoxy type | Epoxy type | Silane type | Oiling agent | Epoxy type |
| Heater temperature (°C.) | | 400 | 400 | . . . | 250 | 400 |
| Type of washing solution | | Acetone | Acetone | . . . | MEK | Acetone |
| Bath conditions for powdery thermoplastic resin | | | | | | |
| Thermoplastic resin powder (B) | | | | | | |
| Type and | a | PA6 | PC | PP | PA6 | PEI |
| ratio of | b | . . . | . . . | . . . | . . . | . . . |
| resin | a/b | . . . | . . . | . . . | . . . | . . . |
| Average particle size ($\mu$m) | | 20 | 7 | 10 | 20 | 8 |
| Largest particle size ($\mu$m) | | 85 | 95 | 95 | 85 | 90 |
| Suspension solution | | | | | | |
| Type and ratio | c | Acetone | Ethanol | Acetone | Acetone | Ethanol |
| of dispersing | d | . . . | . . . | . . . | . . . | . . . |
| medium | c/d | . . . | . . . | . . . | . . . | . . . |
| Concentration (% by weight) | | 25 | 35 | 35 | 25 | 30 |
| Binder solution | | | | | | |
| Resin type (C) | | Alcohol-soluble nylon | Alcohol-soluble nylon | Alcohol-soluble nylon | Alcohol-soluble nylon | Water-soluble nylon |
| Type and ratio | e | Methanol | Methanol | Methanol | Methanol | Water |
| of solvent | f | . . . | . . . | . . . | . . . | . . . |
| | e/f | . . . | . . . | . . . | . . . | . . . |
| Concentration of solution (% by weight) | | 0.02 | 0.02 | 0.02 | 0.16 | 0.16 |
| Range of boiling point of solvent (°C.) | | 64~66 | 64~66 | 64~66 | 64~66 | 100 |
| Viscosity of solution (cps) | | 5 | 5 | 5 | 20 | 28 |
| Solution pH | | 6~8 | 6~8 | 6~8 | 6~8 | 6~8 |
| Dryer temperature | | 100 | 100 | 100 | 100 | 140 |

TABLE 4

| Example | 6 | 7 | 8 | 9 | 10 |
|---|---|---|---|---|---|
| Reinforcing fiber (A) | Carbon fiber | Carbon fiber | Glass fiber | Aramide fiber | Carbon fiber |
| Bundling conditions | | | | | |
| Type of bundling agent | Epoxy type | Epoxy type | Epoxy type | Epoxy type | Epoxy type |

TABLE 4-continued

| Example | | 6 | 7 | 8 | 9 | 10 |
|---|---|---|---|---|---|---|
| Heater temperature (°C.) | | 400 | 400 | 400 | 400 | 400 |
| Type of washing solution | | Acetone | Acetone | Acetone | Acetone | Acetone |
| Bath conditions for powdery thermoplastic resin | | | | | | |
| Thermoplastic resin powder (B) | | | | | | |
| Type and ratio of resin | a | PES | PPS | PEEK | PPS | Thermoplastic PI |
| | b | ... | ... | ... | PC | PEEK |
| | a/b | ... | ... | ... | 80/20 | 50/50 |
| Average particle size (μm) | | 25 | 8 | 8 | 8 | 7 |
| Largest particle size (μm) | | 97 | 98 | 90 | 97 | 96 |
| Suspension solution | | | | | | |
| Type and ratio of dispersing medium | c | Ethanol | Acetone | Acetone | Ethanol | MEK |
| | d | ... | Methyl cellosolve | ... | ... | Ethanol |
| | c/d | ... | 70/30 | ... | ... | 80/20 |
| Concentration (% by weight) | | 40 | 45 | 30 | 40 | 45 |
| Binder solution | | | | | | |
| Resin type (C) | | Water-soluble nylon | PC | PES | Water-soluble nylon | PEI |
| Type and ratio of solvent | e | Water | Methanol chloride | Methanol chloride | Water | Water chloride |
| | f | ... | DMF | NMP | ... | ... |
| | e/f | ... | 90/10 | 50/50 | ... | ... |
| Concentration of solution (% by weight) | | 0.02 | 0.03 | 0.03 | 0.02 | 0.16 |
| Range of boiling point of solvent (°C.) | | 100 | ~153 | ~170 | 100 | 40~42 |
| Viscosity of solution (cps) | | 7 | 10 | 10 | 7 | 32 |
| Solution pH | | 6~8 | 6~8 | 6~8 | 6~8 | 6~8 |
| Dryer temperature | | 140 | 180 | 180 | 140 | 90 |

TABLE 5

| Example | 1 | 2 | 3 | 4 | 5 |
|---|---|---|---|---|---|
| Properties of molding material | | | | | |
| Form | Strand | Strand | Strand | Strand | Sheet |
| Residual solvent (wt %) | 0.3 | 0.2 | 0.1 | 0.4 | 0.6 |
| Resin deposition (wt %) | 33 | 34 | 24 | 38 | 34 |
| Fiber weight (g/cm²) | 75 | 75 | 100 | 61 | 150 |
| Binder (wt %) | 1.3 | 0.5 | 1.0 | 5.6 | 6.4 |
| Weight decrement*¹ (wt %) | 0.5 | 1.0 | 0.2 | 0.5 | 3.3 |
| Measuring temperature (°C.) | 225 | 240 | 167 | 225 | 340 |
| Handleability | | | | | |
| Drape properties (mg.cm) | 400 | 450 | 520 | 1000 | 1200 |
| Dissociation of resin | None | None | None | None | None |
| Splitting of fiber | None | None | None | None | None |
| Bulk factor (%) | 32 | 35 | 51 | 54 | 55 |
| Molding conditions | | | | | |
| Resin content of prepreg (wt %) | 31 | 32 | 21 | 35 | ... |
| Fiber weight of prepreg (g/m²) | 150 | 150 | 200 | 122 | ... |
| Ply number | 14 | 14 | 15 | 14 | 14 |
| Molding temperature (°C.) | 250 | 290 | 250 | 250 | 350 |
| Properties of lamination plate | | | | | |
| Bending strength (kgf/mm²) | 140 | 150 | 105 | 110 | 180 |
| Bending elastic modulus (ton/mm²) | 12.4 | 12.3 | 4.0 | 7.1 | 12.5 |
| ILSS (kgf/mm²) | 10.5 | 11.2 | 7.2 | 6.2 | 11.7 |
| Fiber volume content (%) | 60 | 60 | 60 | 60 | 60 |

*¹: Weight decrement ratio at melting point or flow point of resin

TABLE 6

| | Example | | | | |
|---|---|---|---|---|---|
| | 6 | 7 | 8 | 9 | 10 |
| Properties of molding materials | | | | | |
| Form | Sheet | Sheet | Sheet | Sheet | Sheet |

TABLE 6-continued

| | Example | | | | |
|---|---|---|---|---|---|
| | 6 | 7 | 8 | 9 | 10 |
| Residual solvent (wt %) | 0.6 | 0.1 | 0.1 | 1.2 | 0.1 |
| Resin deposition (wt %) | 35 | 35 | 34 | 35 | 35 |
| Fiber weight (g/cm²) | 150 | 150 | 150 | 150 | 150 |
| Binder (wt %) | 0.5 | 0.5 | 0.5 | 0.7 | 7.0 |
| Weight decrement (wt %)*¹ | 2.4 | 0.1 | 0.1 | 2.5 | 0.2 |
| Measuring temperature (°C.) | 310 | 285 | 334 | 285 | 388 |
| Handleability | | | | | |
| Drape properties (mg · cm) | 700 | 1500 | 1600 | 480 | 4000 |
| Dissociation of resin | None | None | None | None | None |
| Splitting of fiber | None | None | None | None | None |
| Bulk factor (%) | 48 | 46 | 40 | 45 | 50 |
| Molding conditions | | | | | |
| Resin content of prepreg (wt %) | — | — | — | — | — |
| Fiber weight of prepreg (g/m²) | — | — | — | — | — |
| Ply number | 14 | 14 | 14 | 14 | 14 |
| Molding temperature (°C.) | 350 | 350 | 380 | 320 | 380 |
| Properties of lamination plate | | | | | |
| Bending strength (kgf/mm²) | 180 | 180 | 185 | 175 | 185 |
| Bending elastic modulus (ton/mm²) | 12.4 | 12.5 | 12.5 | 12.4 | 12.5 |
| ILSS (kgf/mm²) | 11.5 | 11.4 | 12.8 | 11.6 | 13.0 |
| Fiber volume content (%) | 60 | 60 | 60 | 60 | 60 |

*¹Weight decrement ratio at melting point or flow point of resin

COMPARATIVE EXAMPLE 1

The same method as in Example 1 was carried out, except for the use of the polyethylene oxide resin shown in Table 2 above as the binder resin. The conditions and the properties of the resulting molding material and lamination plate are shown in Tables 7 and 8 below.

COMPARATIVE EXAMPLE 2

The same method as in Example 1 was carried out, except for the use of the polyether imide resin powder shown in Table 1 above as the thermoplastic resin powder, ethanol as the dispersing medium, and the polyvinyl alcohol resin shown in Table 2 above as the binder resin. The conditions and the properties of the resulting molding material and laminated plate are shown in Tables 7 and 8 below.

COMPARATIVE EXAMPLE 3

The same method as in Example 1 was carried out, except for the use of the polyether ether ketone resin powder shown in Table 1 above as the thermoplastic resin powder. The conditions and the properties of the resulting molding material and laminated plate are shown in Tables 7 and 8 below.

COMPARATIVE EXAMPLE 4

The same method as in Example 1 was carried out, except for the use of the polyether imide resin shown in Table 1 above as the thermoplastic resin powder, ethanol as the dispersing medium, the polycarbonate resin shown in Table 2 above as the binder resin, and the solvent for the matrix resin as the solvent of the binder solution. The conditions and the properties of the resulting molding material and laminated plate are shown in Tables 7 and 8 below.

COMPARATIVE EXAMPLE 5

The same method as in Example 2 was carried out, except for the use of a polycarbonate resin with a larger particle size as the thermoplastic resin powder. The conditions and the properties of the resulting molding material and laminated plate are shown in Tables 7 and 8 below.

TABLE 7

| | Comparative Example | | | | |
|---|---|---|---|---|---|
| | 1 | 2 | 3 | 4 | 5 |
| Reinforcing fiber (A) | Carbon fiber | Carbon fiber | Glass fiber | Carbon fiber | Carbon fiber |
| Bundling conditions | | | | | |
| Type of bundling agent | Epoxy type | Epoxy type | Epoxy type | Epoxy type | Epoxy type |
| Heater temperature (°C.) | 400 | 400 | 400 | 400 | 400 |
| Type of washing solution | Acetone | Acetone | Acetone | Acetone | Acetone |
| Bath conditions for powdery thermoplastic resin | | | | | |
| Thermoplastic resin powder (B) | | | | | |
| Type and ratio of resin | | | | | |
| a | PA6 | PEI | PEEK | PEI | PC |
| b | — | — | — | — | — |
| a/b | — | — | — | — | — |
| Average particle size (μm) | 20 | 25 | 8 | 25 | 80 |
| Largest particle | 85 | 25 | 90 | 97 | 200 |

TABLE 7-continued

|  | Comparative Example | | | | |
|---|---|---|---|---|---|
|  | 1 | 2 | 3 | 4 | 5 |
| size ($\mu$m) | | | | | |
| Suspension solution | | | | | |
| Type and ratio of dispersing medium | | | | | |
| c | Acetone | Ethanol | Acetone | Ethanol | Ethanol |
| d | — | — | — | — | — |
| c/d | — | — | — | — | — |
| Concentration (% by weight) | 25 | 35 | 35 | 25 | 30 |
| Binder solution | | | | | |
| Resin type (C) | PEO | PVA | Alcohol-soluble nylon | PC | Alcohol-soluble nylon |
| Type and ratio of solvent | | | | | |
| e | Water | Water | Methanol | Methylene chloride | Methanol |
| f | — | — | — | DMF | — |
| e/f | — | — | — | 90/10 | — |
| Concentration of solution (% by weight) | 0.02 | 0.02 | 0.02 | 0.03 | 0.02 |
| Range of boiling point of solvent (°C.) | 100 | 100 | 64~66 | ~153 | 64~66 |
| Viscosity of solution (cps) | 5 | 5 | 5 | 10 | 5 |
| Solution pH | 6~8 | 6~8 | 6~8 | 6~8 | 6~8 |
| Dryer temperature | 140 | 140 | 100 | 180 | 100 |

TABLE 8

|  | Comparative Example | | | | |
|---|---|---|---|---|---|
|  | 1 | 2 | 3 | 4 | 5 |
| Properties of molding material | | | | | |
| Form | Strand | Strand | Strand | Strand | Strand |
| Residual solvent (wt %) | 1.0 | 0.4 | 0.3 | 0.3 | 0.2 |
| Resin deposition (wt %) | 33 | 36 | 36 | 36 | 34 |
| Fiber weight (g/cm$^2$) | 75 | 75 | 75 | 75 | 75 |
| Binder (wt %) | 1.3 | 0.5 | 1.0 | 0.7 | 0.8 |
| Weight decrement (wt %)*1 | 40 | 48 | 17 | 4.3 | 1.0 |
| Measuring temperature (°C.) | 225 | 340 | 334 | 340 | 240 |
| Handleability | | | | | |
| Drape properties (mg · cm) | 400 | 450 | 520 | 50000 | 640 |
| Dissociation of resin | None | None | None | None | None |
| Splitting of fiber | None | None | None | None | None |
| Bulk factor (%) | 32 | 35 | 51 | 20 | 200 |
| Molding conditions | | | | | |
| Resin content of prepreg (wt %) | 34 | 34 | 34 | 34 | 32 |
| Fiber weight of prepreg (g/m$^2$) | 150 | 150 | 150 | 150 | 150 |
| Ply number | 14 | 14 | 14 | 14 | 14 |
| Molding temperature (°C.) | 250 | 350 | 380 | 350 | 290 |
| Properties of lamination plate | | | | | |
| Bending strength (kgf/mm$^2$) | 110 | 130 | 150 | 182 | 105 |
| Bending elastic modulus (ton/mm$^2$) | 11.9 | 12.0 | 12.2 | 12.5 | 11.2 |
| ILSS (kgf/mm$^2$) | 9.5 | 10.2 | 11.0 | 11.6 | 9.4 |
| Fiber volume content (%) | 60 | 60 | 60 | 60 | 60 |

*1Weight decrement ratio at melting point or flow point of resin

EXAMPLE 11

The same method as in Example 1 was carried out, except for the use as the binder resin of a mixture of 100 parts by weight of water-soluble nylon (Product name: Trejin F535Q, manufactured by Teikoku Chemical Industry Co., Ltd.), 15 parts by weight of melamine (Product name: SUMITEX M3, manufactured by SUMITOMO CHEMICAL CO., LTD.), and 1.5 parts by weight of an organic amine catalyst (Product name: SUMITEX ACCEL ACX, manufactured by SUMITOMO CHEMICAL CO., LTD.) and that the solvent of the binder resin was methanol and water (10:90 in part by weight). The conditions for production and the properties of the resulting molding material and laminated plate are shown in Tables 9 and 10 below.

EXAMPLE 12

The same method as in Example 1 was carried out, except for the use as the binder resin of a mixture of 100 parts by weight of water-soluble nylon (Product name: Trejin F5350, manufactured by Teikoku Chemical Industry Co., Ltd. ), 15 parts by weight of epoxy (Product name: Epicoat 828, manufactured by Yuka Shell Co., Ltd.), and 1.5 parts by weight of an organic amine catalyst (Product name: SUMI-TEX ACCEL ACX, manufactured by SUMITOMO CHEMICAL CO., LTD.) and that the solvent of the binder resin was methanol and water (10:90 in part by weight). The conditions for production and the properties of the resulting molding material and laminated plate are shown in Tables 9 and 10 below.

TABLE 9

|  | Example | |
| --- | --- | --- |
|  | 11 | 12 |
| Reinforcing fiber (A) Bundling conditions | Carbon fiber | Carbon fiber |
| Type of bundling agent | Epoxy type | Epoxy type |
| Heater temperature (°C.) | 400 | 400 |
| Type of washing solution | Acetone | Acetone |
| Bath conditions for powdery thermoplastic resin |  |  |
| Thermoplastic resin powder (B) |  |  |
| Type and ratio of resin |  |  |
| a | PA6 | PA6 |
| b | — | — |
| a/b | — | — |
| Average particle size (μm) | 20 | 20 |
| Largest particle size (μm) | 85 | 85 |
| Suspension solution Type and ratio of dispersing medium |  |  |
| c | Acetone | Acetone |
| d | — | — |
| c/d | — | — |
| Concentration (% by weight) | 25 | 25 |
| Binder solution |  |  |
| Resin type (C) | Water-soluble nylon 100 Melamine 15 Catalyst 1.5 | Water-soluble nylon 100 Epoxy 15 Catalyst 1.5 |
| Type and ratio of solvent |  |  |
| e | Methanol | Methanol |
| f | Water | Water |
| e/f | 10/90 | 10/90 |
| Concentration of solution (% by weight) | 0.02 | 0.02 |
| Range of boiling point of solvent (°C.) | ~100 | ~100 |
| Viscosity of solution (cps) | 5 | 5 |
| Solution pH | 6~8 | 6~8 |
| Dryer temperature | 130 | 130 |

TABLE 10

|  | Example | |
| --- | --- | --- |
|  | 11 | 12 |
| Properties of molding material |  |  |
| Form | Strand | Strand |
| Residual solvent (wt %) | 0.2 | 0.2 |
| Resin deposition (wt %) | 38 | 38 |
| Fiber weight (g/cm²) | 75 | 75 |
| Binder (wt %) | 5 | 5 |
| Weight decrement (wt %)*1 | 0.5 | 1.0 |
| Measuring temperature (°C.) | 225 | 240 |
| Handleability |  |  |
| Drape properties (mg · cm) | 600 | 650 |
| Dissociation of resin | None | None |
| Splitting of fiber | None | None |
| Bulk factor (%) | 40 | 35 |
| Molding conditions |  |  |
| Resin content of prepreg (wt %) | 36 | 36 |
| Fiber weight of prepreg (g/m²) | 150 | 150 |
| Ply number | 14 | 14 |
| Molding temperature (°C.) | 250 | 290 |
| Properties of lamination plate |  |  |
| Bending strength (kgf/mm²) | 153 | 150 |
| Bending elastic modulus (ton/mm²) | 13.0 | 13.3 |
| ILSS (kgf/mm²) | 10.5 | 10.0 |
| Fiber volume content (%) | 60 | 60 |

*1 Weight decrement ratio at melting point or flow point of resin

INDUSTRIAL APPLICABILITY

The molding material and the method for producing the molding material in accordance with the present invention are characterized in that a dispersion solution of a highly dispersible thermoplastic resin powder can uniformly be applied to the individual fibers of a reinforcing continuous fiber bundle; that the decomposition of a binder resin contained in the molding material can be suppressed during molding; that the generation of decomposition gas is negligible; and that the fiber content in the molding material can be elevated, whereby the molding material and the method for producing the molding material in accordance with the present invention can impart great composite properties and appearance to the resulting molded articles.

In addition to the effects described above, the molding material and the method for producing the molding material in accordance with the present invention are characterized in that the produced molding material per se is non-adhesive, substantially never containing any solvent of the binder resin, but having drape, reduced dissociation of the thermoplastic resin powder and splitting of the reinforcing fiber and having improved bulkiness. Thus, the molding material has good handleability.

We claim:

1. A method for producing a molding material, comprising the steps of:

1) depositing a thermoplastic resin powder in between the individual fibers of a reinforcing continuous fiber bundle;

2) applying a solution of a binder resin dissolved in a solvent to the resulting reinforcing continuous fiber bundle with the deposited thermoplastic resin powder, whereby the thermoplastic resin powder is fixed at pin-point binding sites in between the individual fibers by the binder resin which concurrently binds the individual fibers together at pin-point binding sites; and 3) removing substantially all the solvent of the binder resin solution from the resulting binder resin-applied reinforcing continuous fiber bundle within a temperature zone at a temperature not above the melting point or flow point of the thermoplastic resin powder.

2. A method for producing a molding material according to claim 1, wherein the 5% weight decrement temperature of the binder resin is above the melting point or flow point of the thermoplastic resin powder.

3. A method for producing a molding material according to claim 1, wherein the thermoplastic resin powder is 20 to 60% by weight of the sum of the weight of the reinforcing continuous fiber bundle and the weight of the thermoplastic resin powder.

4. A method for producing a molding material according to claim 1, wherein the content of the solvent of the binder resin solution is reduced to 3% by weight or less in the molding material immediately after the removing of the solvent.

5. A method for producing a molding material according to claim 1, wherein the solvent for the binder resin does not dissolve or partially dissolves the thermoplastic resin powder.

6. A method for producing a molding material according to claim 1, wherein the applying of the solution of the binder resin is by a process selected from the group consisting of an immersion process, a jetting process and a kiss-roll process.

7. A method for producing a molding material according to claim 1, wherein the concentration of the solution of the binder resin is 0.01 to 2% by weight.

8. A method for producing a molding material according to claim 1, wherein the binder resin is 0.1 to 10% by weight of the sum of the weight of the reinforcing continuous fiber bundle, the weight of the thermoplastic resin powder and the weight of the binder resin.

9. A method for producing a molding material according to claim 1, wherein the depositing the thermoplastic resin powder in between the individual fibers of the reinforcing continuous fiber bundle is by a process selected from the group consisting of a fluid-bed process, an electrostatic deposition process and a suspension process.

* * * * *

UNITED STATES PATENT AND TRADEMARK OFFICE
CERTIFICATE OF CORRECTION

PATENT NO.    : 6,054,177                                           Page 1 of 1
DATED         : April 25, 2000
INVENTOR(S)   : Endoh et al.

It is certified that error appears in the above-identified patent and that said Letters Patent is hereby corrected as shown below:

Column 9,
Line 27, "10°C. min." should read -- 10°C/min. --.

Column 23,
Table 4 – continued, under the heading "Concentration (% by weight) Binder Solution", "Type and ratio of solvent", Column 7,
"Methanol" should read -- Methylene" --;

Column 8,
"Methanol" should read -- Methylene --;

Column 10,
"Water" should read -- Methylene" --.

Signed and Sealed this

Eleventh Day of September, 2001

Attest:

NICHOLAS P. GODICI
*Attesting Officer*     *Acting Director of the United States Patent and Trademark Office*